Figure 1:
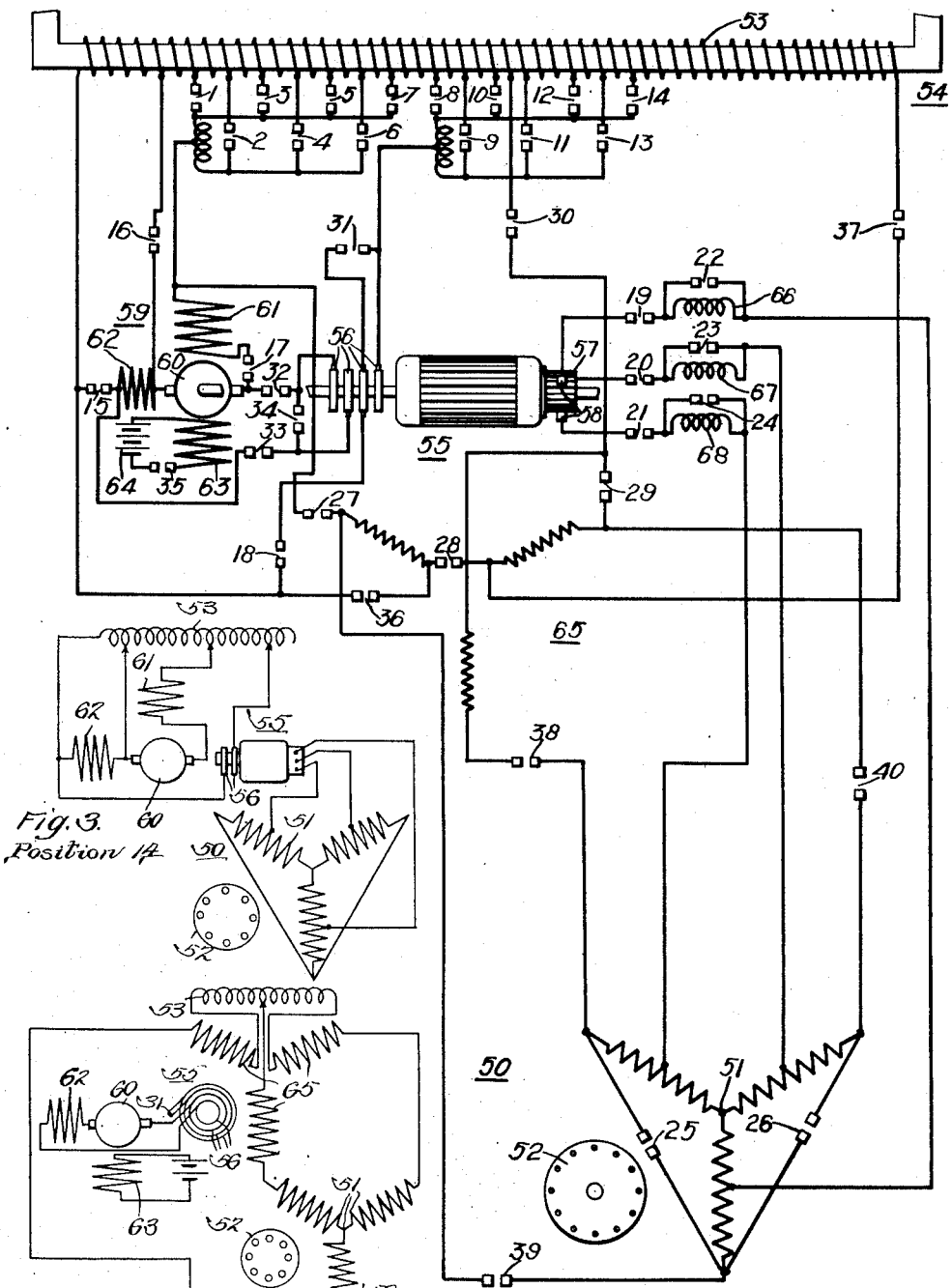

R. E. HELLMUND.
MEANS FOR AND METHOD OF ACCELERATING INDUCTION MOTORS.
APPLICATION FILED AUG. 10, 1918.

1,417,732.

Patented May 30, 1922.

2 SHEETS—SHEET 2.

Fig. 2.

INVENTOR
Rudolf E. Hellmund
BY
ATTORNEY

WITNESSES:

UNITED STATES PATENT OFFICE.

RUDOLF E. HELLMUND, OF SWISSVALE, PENNSYLVANIA, ASSIGNOR TO WESTINGHOUSE ELECTRIC & MANUFACTURING COMPANY, A CORPORATION OF PENNSYLVANIA.

MEANS FOR AND METHOD OF ACCELERATING INDUCTION MOTORS.

1,417,732.      Specification of Letters Patent.     Patented May 30, 1922.

Application filed August 10, 1918. Serial No. 249,336.

*To all whom it may concern:*

Be it known that I, RUDOLF E. HELLMUND, a subject of the German Empire, and a resident of Swissvale, in the county of Allegheny and State of Pennsylvania, have invented a new and useful Improvement in Means for and Methods of Accelerating Induction Motors, of which the following is a specification.

My invention relates to means for, and methods of, accelerating induction motors by the use of combined frequency changers and phase converters.

It has been frequently suggested that use be made of a combined frequency changer and phase converter to accelerate induction motors, but difficulty has been experienced with such systems on account of the fact that it is difficult to design a commutator frequency changer for large outputs, such, for instance, as are required in heavy traction operations, to work with full line frequency on the commutator; in other words, it has not been feasible to apply either full line voltage or full line frequency to a commutator-type frequency changer.

I, therefore, propose to insert between a multiplex-pole induction motor aggregate and its source of energy-supply a combined frequency changer and phase converter and to so associate switching means therewith that the motor may be accelerated to synchronous speed for its smaller number of poles and approximately one half line frequency, and thereafter to reconnect the induction motor with a straight phase converter and operate the same in conjunction with full line frequency and with its larger number of poles. This is possible because the synchronous speed for the larger number of poles and full line frequency will be the same as for the smaller number of poles and one half line frequency.

If the motor aggregate, therefore, is accelerated, with the smaller number of poles, through the medium of a combined frequency changer and phase converter, up to approximately one half line frequency, it can thereafter be reconnected for its larger number of poles, and the auxiliary combined machine be used as a straight phase converter. By the use of this system of acceleration, all the advantages incident to the employment of a commutator-type frequency changer will be obtained without the disadvantages hitherto experienced under heavy-load conditions.

For a detailed description of the combined phase converter and frequency changer utilized by me, reference may be had to the United States Patent No. 682,943, issued on Sept. 17, 1901 to the Westinghouse Electric & Manufacturing Company upon application by B. G. Lamme.

Referring now to the drawings, Figure 1 is a diagrammatic view of the machines used and the switching means whereby they perform their desired functions, while Fig. 2 is a sequence chart of said switching means. Figures 3 and 4 are diagrammatic views illustrating the connections corresponding to certain controller-positions.

Referring more particularly to Fig. 1, a duplex-pole induction motor 50, consisting of a primary 51 and secondary 52, is supplied with energy from any suitable single-phase source such, for instance, as the secondary winding 53 of a transformer 54, through the medium of a combined frequency changer and phase converter 55. The phase converter and frequency changer 55 is here shown as having a rotor wound for two phases and fed through slip rings 56, and having, at its opposite end, a commutator 57 upon which bear brushes 58. Mounted upon the same shaft as the rotor of the machine 55 is an armature 60 of a commutator-type generator 59 having field windings 61, 62 and 63, the field winding 63 being separately excited from any suitable direct-current source such, for instance, as a battery 64.

The frequency changer 55 is provided with a star-connected field winding 65. Inserted between the commutator end of the machine 55 and the primary member of the induction motor 50 are inductive devices 66, 67 and 68, being so placed for the purpose of limiting the current flow between the two machines at certain predetermined periods in the operation thereof.

Switches 1 to 14, inclusive, are provided to raise and lower the voltage impressed upon the phase converter 55 and auxiliary machine 59. A switch 15 is inserted between one terminal of the transformer winding 53 and the field winding 62 of the machine 60, the other end of this field winding being connected to the transformer winding through a switch 16.

In order to provide means whereby the auxiliary machine 59 may have its field winding 61 and its armature 60 disconnected from an energy-supply source, a switch 17 is provided. At certain predetermined periods, the armature of the machine 55 may be disconnected from the energy source 53 by the use of a switch 18 inserted between one of the slip rings 56 and said energy source.

Switches 19, 20 and 21 are placed in the leads between the commutator end of the machine 55 and the primary 51 of the induction motor 50 for disconnecting the two, while switches 22, 23 and 24 short circuit the inductive devices 66, 67 and 68 at predetermined periods.

By the use of switches 25 and 26, the primary winding 51 may be arranged for parallel star connection with a small number of poles when desired. The winding 65 of the machine 55 may be connected for single-phase operation by switches 27, 28, 29 and 30. For straight phase-converter operation, the switch 30 is provided between the energy-supply source and the winding 65, while the rotor phases of the machine 55 are short-circuited through switches 31 and 34. For the purpose of supplying direct current to the rotor of the machine 59, switches 32, 33 and 35 are provided.

In order to furnish energy to the winding 65 only of the machine 55 switches 36 and 37 are employed, and to further connect the winding 65 to the winding 51, switches 38, 39 and 40 are used.

Having described the relative positions of the various machines in my accelerating system and the switching means whereby they may be connected and disconnected from each other, the operation of the system is as folows:

Referring to Fig. 2, the switching sequence of the variously numbered switches shown in Fig. 1 is illustrated. In steps 1 to 6, inclusive, the frequency changer is accelerated by supplying energy to its driving machine 59, which is arranged to act as a doubly fed motor, through the closing of switches 15, 16 and 17 and thereafter gradually increasing the voltage impressed thereupon by the use of the switches 1 to 7, inclusive.

At step 7 is shown the position of the switches whereby the frequency changer is connected to the line, voltage being impressed thereupon through the closing of the switches 8 and 9, and 18.

The induction motor is now started, with its smaller number of poles, through the use of the machine 55 operating as combined frequency changer and phase converter. Steps 8 to 24, inclusive, illustrate the manner in which the induction motor is brought to synchronous speed for one-half of full line frequency with the smaller number of poles. It will be observed that the voltage is first raised and then the frequency adjusted, this step constituting a novel method in the operation of such systems and one whereby increased efficiency of operation is obtained. At each accelerating step, as shown by the switching sequence, the inductive devices 66, 67 and 68 are placed in circuit between the machine 55 and the machine 50. Such insertion of the inductive devices is instrumental in suppressing high harmonic currents and excessive currents as well while taking a step and, while I have shown, for convenience, such devices as inductance coils, it may be possible to replace the same by any other voltage-consuming device, if desired.

Fig. 3 illustrates the circuit connections corresponding to controller-position 14 and similar positions during the operation just described.

Having now brought the induction motor 50 up to synchronous speed, with one-half full line frequency and relatively low voltage, in conjunction with its smaller number of poles, it will be apparent that it is also running at synchronous speed for its larger number of poles and full line frequency, and steps 25 and 26 illustrate the switching means whereby the motor is temporarily disconnected and the phase converter brought back to synchronous speed.

It is next necessary to excite the phase converter by direct current, and the switching sequence necessary to accomplish this is shown in steps 27, 28 and 29. Having the phase converter now running at synchronous speed and excited from a source of direct current, that is, from the machine 59, which, it will be observed, is now being driven by the machine 55 and has its separately excited field winding 63 energized, the induction motor 50 may be reconnected, through the switches 38, 39 and 40, to the winding 65 of the phase converter and thereafter run at full line frequency and voltage, as indicated in Fig. 4.

It will be observed that the system is now operating with the machine 55 functioning as a straight phase converter, the rotor of which is excited from a source of direct current and the stator of which is connected, phase for phase, with the primary 51 of the induction motor 50. For a more detailed description of this type of connection, reference may be had to a co-pending application of C. Le G. Fortescue, Serial No. 206,932, filed Dec. 13, 1917, and assigned to the Westinghouse Electric & Manufacturing Company.

While the operation of a system embodying my invention has been described in connection with an induction motor having a two-speed winding of the usual character, it will be evident, to those skilled in the art, that any other two-speed motor arrangement can be used.

For instance, the system described herein may be used in connection with a pair of motors which are connected in parallel during acceleration and cascaded after full speed is reached.

By the term "induction-motor aggregate," as employed in the claims, I mean any aggroupment of members and windings assembled in operative relation to constitute, in effect, an induction motor, whether as a single motor or as a plurality of mechanically connected induction machines.

Certain of the broader features of my invention, relating to the application of variable frequencies and voltages to an induction motor, are covered in my copending application, Serial No. 249,335, filed August 10, 1918.

While I have described my frequency changer and phase-converter system of accelerating a multiplex-pole induction motor as operating with but two pole numbers, I wish it to be understood that it is possible to employ an induction motor of more than two pole numbers and to associate therewith means for accelerating the same in the hereinbefore described manner without departing from the scope of my invention. In view of the foregoing statements, I wish only such limitations to be placed upon the appended claims as are imposed by the scope of the prior art or particularly specified therein.

I claim as my invention:

1. The combination of an induction-motor aggregate having connections for two synchronous speeds, a source of constant-frequency currents, a source of variable-frequency currents of relatively low frequency and switching means for connecting the high-speed motor connections to the low-frequency source and for connecting the low-speed motor connections to the high-frequency source, the frequencies of said sources being such that the maximum synchronous speed with the high-speed, low-frequency connection is substantially the same as the synchronous speed with the low-speed, high-frequency connection.

2. The combination of an induction-motor aggregate having connections for two synchronous speeds, a source of constant-frequency currents, a source of variable-frequency currents of relatively low frequency and switching means for connecting the high-speed motor connections to the low-frequency source and for connecting the low-speed motor connections to the high-frequency source.

3. The combination of an induction-motor aggregate having connections for two synchronous speeds, a source of constant-frequency currents, a variable-ratio frequency converter associated therewith and switching means for connecting the high-speed motor connections to said frequency converter and for connecting the low-speed motor connections to said source.

4. The combination of an induction-motor aggregate having connections for two synchronous speeds, a source of constant-frequency currents, a variable-ratio frequency converter associated therewith, switching means for connecting the high-speed motor connections to said frequency converter and for connecting the low-speed motor connections to said source, and means for causing the frequency of said frequency converter to vary between the limits of zero and a relatively low frequency such that the synchronous speed with the high-speed, low-frequency connection is substantially the same as with the low-speed, high-frequency connection.

5. The method of operating an induction-motor aggregate having connections producing different effective pole-numbers from sources having different frequencies, which consists in starting said aggregate with a connection producing a relatively small pole-number energized from a relatively low-frequency source and subsequently operating said aggregate with a connection producing a relatively large pole-number energized from a relatively high-frequency source.

6. The method of operating an induction-motor aggregate having connections producing different effective pole-numbers from sources having different frequencies, which consists in starting said aggregate with a connection producing a relatively small number of poles energized from a relatively low-frequency source, accelerating said aggregate to substantially synchronous speed for said connection, and subsequently operating said aggregate at substantially the same speed with a connection producing a relatively large pole-number energized from a relatively high-frequency source.

7. The method of operating an induction-motor aggregate having connections producing different pole numbers from a source of constant-frequency currents and a source of variable-frequency currents of relatively low frequency, which consists in, at times, operating said aggregate with a connection producing a relatively small number of poles energized from said variable frequency source, and, at other times, operating said aggregate with a connection producing a relatively large number of poles energized from said constant-frequency source.

8. The method of operating an induction-motor aggregate having connections producing different pole-numbers from a source of constant-frequency currents and a source of variable-frequency currents, which consists in, at times, operating said aggregate energized from said variable frequency source, and, at other times, operating said aggregate with a connection producing a different number of poles energized from said constant-frequency source.

9. The method of operating an induction-motor aggregate having connections producing different pole numbers from a source of constant-frequency currents and a source of variable-frequency currents of relatively low frequency, which consists in, at times, operating said aggregate with a connection producing a relatively small number of poles energized from said variable frequency source and, at other times, operating said aggregate at a speed substantially the same as the highest speed thus obtained, with a connection producing a relatively large number of poles energized from said constant-frequency source.

10. A combined frequency-changing and phase-balancing machine comprising an armature winding connected to terminal conductors and a commutator member, brushes for the latter, means for, at times, causing a variable relative rotation of said commutator member with respect to said brushes to adapt said machine to operate as a frequency changer, a polyphase field winding associated with said armature winding, and means for, at other times, energizing said field winding and providing a polyphase close-circuited path for said armature winding to adapt said machine to operate as a phase-balancer.

11. The combination with a polyphase induction-motor aggregate and a source of single-phase power, of a combined frequency-changing and phase-balancing machine comprising an armature winding connected to terminal conductors and a commutator member, brushes for the latter, means for, at times, causing a variable relative rotation of said commutator member with respect to said brushes to adapt said machine to operate as a frequently changer, connections for causing said frequency changer to transfer power from said source to said motor aggregate, a polyphase field winding associated with said armature winding, and means for, at other times, providing a polyphase close-circuited path for said armature winding and for connecting said field winding as a phase-balancer winding for interchanging energy between said source and said motor aggregate.

12. The combination with a polyphase induction-motor aggregate having connections producing different pole-numbers, of a source of single-phase power, a combined frequency-changing and phase-balancing machine comprising an armature winding connected to terminal conductors and a commutator member, brushes for the latter, means for, at times, causing a variable relative rotation of said commutator member with respect to said brushes to adapt said machine to operate as a frequency changer, connections for causing said frequency changer to transfer power from said source to a motor connection producing a relatively small number of poles, a polyphase field winding associated with said armature winding, and means for, at other times, providing a polyphase close-circuited path for said armature winding and for connecting said field winding as a phase-balancing winding for interchanging energy between said source and a motor connection producing a relatively large number of poles.

13. The method of operating an induction motor aggregate adapted for connection for $n$ and $an$ poles which comprises impressing an electromotive force of low frequency thereupon when connected for $n$ poles, increasing the frequency to $\frac{1}{a}$ of line frequency for acceleration, and then impressing an electromotive force of line frequency thereon when connected for $an$ poles.

14. The method of operating an induction motor aggregate adapted for connection for $n$ and $an$ poles which comprises impressing an electromotive force of low frequency thereupon when connected for $n$ poles, increasing the frequency to $\frac{1}{a}$ of line frequency for acceleration, said acceleration consisting in raising the frequency and voltage of the energy supplied to the aggregate in alternative steps, and then impressing an electromotive force of line frequency thereon when connected for $an$ poles.

15. The method of operating an induction motor aggregate adapted for connection for $n$ and $an$ poles which comprises impressing an electromotive force of low frequency thereupon when connected for $n$ poles, increasing the frequency to $\frac{1}{a}$ of line frequency for acceleration, said acceleration consisting in raising the frequency and voltage of the energy supplied to the aggregate in alternative steps, then impressing an electromotive force of line frequency thereon when connected for $an$ poles, and inserting current-limiting means in circuit during each voltage-raising step.

16. The method of accelerating an induction motor associated with a frequency changer which consists in taking steps tending to vary first the voltage and then the frequency of said frequency changer during each step of the acceleration of said induction motor and temporarily inserting a current-limiting device prior to said voltage-varying operation.

In testimony whereof, I have hereunto subscribed my name this 31st day of July 1918.

RUDOLF E. HELLMUND.